(12) United States Patent
Joret et al.

(10) Patent No.: US 11,959,437 B2
(45) Date of Patent: Apr. 16, 2024

(54) FASTENING OF AN EXHAUST CONE IN A TURBOMACHINE NOZZLE

(71) Applicants: SAFRAN NACELLES, Gonfreville-L'Orcher (FR); SAFRAN CERAMICS, Le Haillan (FR)

(72) Inventors: Jean-Philippe Joret, Moissy-Cramayel (FR); Vincent Devanlay, Moissy-Cramayel (FR); Fabien Bravin, Moissy-Cramayel (FR); Thomas Vandellos, Moissy-Cramayel (FR)

(73) Assignees: SAFRAN NACELLES, Gonfreville-l'Orcher (FR); SAFRAN CERAMICS, Le Haillan (FR)

( * ) Notice: Subject to any disclaimer, the term of this patent is extended or adjusted under 35 U.S.C. 154(b) by 0 days.

(21) Appl. No.: 18/251,798

(22) PCT Filed: Nov. 3, 2021

(86) PCT No.: PCT/FR2021/051935
§ 371 (c)(1),
(2) Date: May 4, 2023

(87) PCT Pub. No.: WO2022/096821
PCT Pub. Date: May 12, 2022

(65) Prior Publication Data
US 2024/0003315 A1 Jan. 4, 2024

(30) Foreign Application Priority Data

Nov. 5, 2020 (FR) ...................................... 2011379

(51) Int. Cl.
*F02K 1/04* (2006.01)
*F02K 1/80* (2006.01)
(52) U.S. Cl.
CPC . *F02K 1/04* (2013.01); *F02K 1/80* (2013.01)

(58) Field of Classification Search
CPC ..................................... F02K 1/04; F02K 1/80
See application file for complete search history.

(56) References Cited

U.S. PATENT DOCUMENTS 8,919,136 B2 * 12/2014 Conete ...................... F02K 1/04
60/799
9,188,024 B2 * 11/2015 Tardif ..................... F01D 25/24
(Continued)

FOREIGN PATENT DOCUMENTS

EP 2 944 776 A1 11/2015
EP 3018 305 A1 5/2016
(Continued)

OTHER PUBLICATIONS

International Search Report dated Mar. 2, 2022, issued in corresponding International Application No. PCT/FR2021/051935, filed Nov. 3, 2021, 5 pages.
(Continued)

*Primary Examiner* — William H Rodriguez
(74) *Attorney, Agent, or Firm* — CHRISTENSEN O'CONNOR JOHNSON KINDNESS PLLC

(57) ABSTRACT

An assembly for a turbomachine nozzle having a longitudinal axis (X) includes an exhaust cone with an annular outer wall for guiding a primary air flow and an annular chamber placed radially inside said annular outer wall. The annular chamber includes an annular inner wall placed radially inside the annular outer wall of the exhaust cone. An exhaust case is placed upstream of the ejection cone. A connecting member is interposed longitudinally between the exhaust case and the exhaust cone and fastened to the exhaust case and to the annular inner wall. The assembly further includes elastic means configured to deform radially and prestressed radially between the annular outer wall and the connecting member.

16 Claims, 7 Drawing Sheets

(56) References Cited

U.S. PATENT DOCUMENTS

| | | | |
|---|---|---|---|
| 9,551,239 B2* | 1/2017 | Byrne | F01D 25/30 |
| 10,316,695 B2* | 6/2019 | Renggli | F01D 25/005 |
| 11,519,361 B2* | 12/2022 | Conete | B64D 33/04 |
| 2011/0203255 A1* | 8/2011 | Conete | F02K 1/80 239/265.11 |
| 2021/0293201 A1* | 9/2021 | Conete | F02K 1/80 |

FOREIGN PATENT DOCUMENTS

| | | | |
|---|---|---|---|
| FR | 2 902 838 A1 | 12/2007 | |
| FR | 2 914 955 A1 | 10/2008 | |
| FR | 3 084 916 A1 | 2/2020 | |

OTHER PUBLICATIONS

Written Opinion dated Mar. 2, 2022, issued in corresponding International Application No. PCT/FR2021/051935, filed Nov. 3, 2021, 6 pages.

* cited by examiner a b

FASTENING OF AN EXHAUST CONE IN A TURBOMACHINE NOZZLE

TECHNICAL FIELD OF THE INVENTION

The invention relates to means for fastening an exhaust cone in a turbomachine nozzle, in particular means for fastening an exhaust cone made of a composite with a ceramic matrix.

PRIOR ART

The present disclosure relates to an assembly located at the rear (downstream end) of an aircraft turbojet engine to optimize the flow of hot gases expelled by the turbojet engine, and possibly absorb at least part of the noise generated by the interaction of these hot gases, coming from the engine inner portions (combustion chamber, turbine(s)), with the ambient air and with the flow of cold air expelled by the fan of the turbojet engine.

More specifically, the present disclosure relates to the connection between what is often referred to as the exhaust cone and, located just upstream, a gas outlet from the turbojet engine.

Typically, the exhaust cone is completed (surrounded) by a so-called primary nozzle portion. The exhaust cone is intended to be positioned downstream of the turbine portion of the turbojet engine, around which the primary nozzle is placed concentrically. The exhaust cone and the primary nozzle are both fastened to a casing of the turbojet engine by a system for fastening by flanges.

An assembly for an aircraft turbojet engine represented in FIG. 1 is known, comprising:
- a central gas exhaust element, annular around a longitudinal axis X and adapted so that gas is ejected by the turbojet engine there around, from upstream to downstream, and
- a connection flange interposed between, upstream, a so-called metallic outlet of a turbojet engine and, downstream, the central element, to connect them together.

The aforementioned longitudinal axis X is the longitudinal axis, or axis of rotation, of the turbomachine, in particular of the fan 20 and of the moving blades of the engine 12.

The central gas exhaust element may correspond to the aforementioned exhaust cone (denoted 1 hereinafter), or at least to the upstream portion 1a hereinafter.

A conventional exhaust cone 1 is represented in FIG. 1, on which the upstream (AM) and downstream (AV) of the structure along an engine axis (longitudinal axis X hereinabove) are located respectively to the left and to the right of the figure.

More generally, an aircraft gas turbojet engine 10 is illustrated in FIG. 1, the central portion of which, forming the gas turbine engine 12, is mounted inside an engine nacelle assembly 14, as is typical of an aircraft designed for subsonic operation, such as a turboprop or turbofan engine. In general, the nacelle assembly 14 comprises an engine nacelle 16 and a fan casing 18 surrounding a fan 20 located axially upstream of the engine 12.

The engine 12 comprises, axially in the downstream portion, at least one turbine which may be a low-pressure turbine and, still in the downstream portion, an exhaust case 22 comprising an inner annular shroud 22a and an outer annular shroud 22b delimiting therebetween a downstream portion of the primary annular flow path 24 in which flow the combustion gases originating from the combustion chamber of the engine 12.

The inner annular shroud 22a is connected, at its downstream end, to the exhaust cone 1, which may comprise an upstream portion 1a, with a substantially cylindrical shape on conventional engines and with a divergent then convergent conical shape on other engines, and a downstream portion 1b with a conical shape.

In practice, it remains difficult to connect together the aforementioned metallic outlet of the turbojet engine, which may be said inner annular shroud 22a, and said central element, which may be said upstream portion 1a of the exhaust cone 1. Indeed, at least one portion of the exhaust cone is made of a material different from the exhaust case, which induces a differential expansion of the parts in presence and the generation of thermomechanical stresses, resulting from the thermal gradients between said portion of the exhaust cone and exhaust case. In addition, an acoustic box may be arranged inside the exhaust cone to reduce the noise pollution of the exhaust gases. The connection of the acoustic box to the exhaust case and/or to the exhaust cone is also complex because of the difference in expansion due to the materials and the temperature differential between the flow path and the inner portion of the acoustic area which generate thermomechanical stresses.

SUMMARY OF THE INVENTION

The present disclosure suggests using an assembly of the exhaust cone to the exhaust case which is more reliable and more robust to thermal gradients by the very fact of its connection to either one of the aforementioned parts. For this purpose, the present disclosure provides an assembly for a turbomachine with a longitudinal axis, in particular for a nozzle of said turbomachine, comprising:
- an exhaust cone comprising an outer annular wall for the flow of a primary air flow and an annular box, which may be an acoustic annular box, arranged radially inside said outer annular wall, the annular box comprising an inner annular wall arranged radially inside the outer annular wall of the exhaust cone,
- an exhaust case arranged upstream of the exhaust cone, and
- a connecting member interposed longitudinally between the exhaust case and the exhaust cone, the connecting member being fastened to the exhaust case and to the inner annular wall, said assembly further comprising at least one elastic means radially deformable and radially prestressed between the outer annular wall and the connecting member.

In particular, a downstream portion of the inner annular wall may be fastened to a downstream portion of the outer annular wall.

According to the present document, the upstream portion of the outer annular wall is free to move relative to the upstream portion of the inner annular wall.

Thus, the outer annular wall is limited in movement in the radial direction and is free to move in the axial and circumferential direction relative to the upstream portion of the inner annular wall. This arrangement allows distributing the forces between the upstream and downstream junctions of the outer annular wall and therefore reducing the thickness of the outer annular wall as well as its mass. In addition, the elastic means prevent the outer annular wall from vibrating on excitation modes of the engine, and limit the forces at the downstream junction of the outer annular wall. In addition, the elastic means are capable of accommodating geometric tolerances and thermal expansion of parts such as the connecting member or the outer annular wall, which are made of different materials.

The elastic means may be prestressed radially by the outer annular wall against the inner annular wall instead of the connecting member.

In the present disclosure, upstream and downstream are defined with respect to the air inlet and outlet of the nozzle, upstream corresponding to the air inlet and downstream to the air outlet. Moreover, the axial direction corresponds to the direction of the axis of revolution of the nozzle of the exhaust cone, which corresponds to the axis of rotation of the turbomachine, and the radial direction is a direction perpendicular to the axis of revolution.

The upstream portion of the outer annular wall may be devoid of any mechanical connections with the inner annular wall or any other portion of the exhaust cone. According to one embodiment, the assembly may comprise means for limiting the radial displacement of the outer annular wall. Said radial displacement limiting means may be interposed, in the radial direction, between the outer annular wall and the connecting member and form a radial stop of the outer annular wall against the connecting member.

The means for limiting the radial displacement of the outer annular wall allow providing support to the outer annular wall in the downstream area and avoiding a large cantilever of the outer annular wall between the downstream area and the downstream.

The radial displacement limiting means may be in continuous or point contact with the connecting member.

The elastic means may be fastened to the outer annular wall and may be in radial contact against the connecting member.

The elastic means may be fastened to the connecting member and may be in radial contact against the outer annular wall.

According to one embodiment, at least one, in particular each elastic means, may be superimposed with a radial displacement limiting means. Each elastic means may be fastened to a displacement limiting means. Thus, each elastic means may be arranged circumferentially at the same location of a radial displacement limiting means.

According to one embodiment, at least one, in particular each elastic means, may be circumferentially spaced apart from one of the radial displacement limiting means.

At least one, in particular each elastic means, may be a leaf spring, the leaf springs being distributed circumferentially around the longitudinal axis.

The leaf springs allow transmitting forces from the outer annular wall according to the different flight situations, ultimate, limit or some fatigue situations.

At least one, in particular each leaf spring, may comprise a first flexible leaf extending in a first direction of the circumferential direction around the longitudinal axis and a second flexible leaf extending in a second direction of the circumferential direction around the longitudinal axis opposite to the first direction.

The first leaf and the second leaf may extend radially inwards from the outer annular wall.

At least one, in particular each leaf spring, may comprise one single leaf extending radially and along the longitudinal axis.

At least one, in particular each leaf spring may extend radially inwards or outwards.

At least one, in particular each leaf spring, may form a radial displacement limiting means.

The radial displacement limiting means may be integrated or attached to the leaf spring.

The assembly may comprise a first annular seal surrounding the junction between the connecting member and the inner annular wall. Said first annular seal may be configured to limit the circulation of the primary air flow towards a cavity of the exhaust cone.

The first annular seal may be arranged so as to axially cover the space between the exhaust case and the inner annular wall.

The first annular seal may be metallic and of the "finger seal" type. The first annular seal may comprise a plurality of angular sectors distributed circumferentially around the longitudinal axis and connected together so as to form the first annular seal.

The first annular seal may be made of tungsten or Inconel.

The assembly may comprise a second annular seal connected to the connecting member and extending radially towards the outer annular wall. Said second annular seal may be configured to prevent the primary air flow from passing through the outer annular wall.

The second annular seal allows reducing the recirculation of the primary air flow and therefore reducing the impact on the performances of the nozzle comprising the assembly.

The second annular seal may be arranged so as to radially cover the space between the exhaust case and the outer annular wall.

The second annular seal may be connected to the connecting member and in contact with the outer annular wall.

The second annular seal may be metallic and may comprise a plurality of angular sectors distributed circumferentially around the longitudinal axis and connected together so as to form the second annular seal.

According to one embodiment, the elastic means may be formed by an annular seal fastened to the connecting member and comprising a radially deformable portion bearing against the outer annular wall.

The annular seal may be angularly continuous and may be formed integrally in one-piece or may be formed by a plurality of angular sectors superimposed at their ends.

The ring seal may be fastened to the connecting member at a first end.

The annular seal may comprise a second end bearing against the inner annular wall.

The ring seal may comprise a second end arranged radially outwards with respect to the first end.

The annular seal may comprise a protuberance extending radially outwards located axially between the first end and the second end, and able to be connected with the outer annular wall.

The annular seal may be metallic.

Each displacement limiting means may be formed by a buffer, the buffers being distributed circumferentially around the longitudinal axis and may be held at a predetermined distance with the connecting member in the radial direction, in particular when the outer annular wall is at rest.

The predetermined distance may depend on the geometric tolerances, the thermal expansion of the parts, and some flight situations which may be loads and combinations of loads encountered daily or occasionally.

A downstream portion of the inner annular wall may be fastened to a downstream portion of the outer annular wall.

The connecting member may comprise an annular flange connected to a corresponding flange of the exhaust case and a plurality of fastening lugs distributed circumferentially around the longitudinal axis and connected to the inner annular wall.

The fastening lugs may be rigid, the connecting member thus forming a fastening flange. Alternatively, the fastening lugs may be flexible, the connecting member thus forming a flexible connecting flange. The flexible fastening lugs allow taking up thermal expansion between the exhaust cone and the exhaust case.

In the case where the annular box is an annular acoustic box intended to absorb and reduce the air outlet noises, the latter may comprise a plurality of acoustic partitions extending radially outwards from the inner annular wall of the annular acoustic box. The acoustic partitions may be metallic.

The inner annular wall or the outer annular wall may be made of composite or metallic material.

The exhaust cone may comprise a downstream portion connected to the outer annular wall made of a composite material with a ceramic matrix.

The exhaust case may be made of a metallic material.

The present disclosure also provides a nozzle for a turbomachine comprising an assembly as mentioned before.

BRIEF DESCRIPTION OF THE FIGURES

FIG. 8a represents a schematic perspective view of the upstream portion of an exhaust cone equipped with a third example of elastic means and FIG. 8b represents a sectional view of the exhaust cone of FIG. 8a.

DETAILED DESCRIPTION OF THE INVENTION

Figure 1:
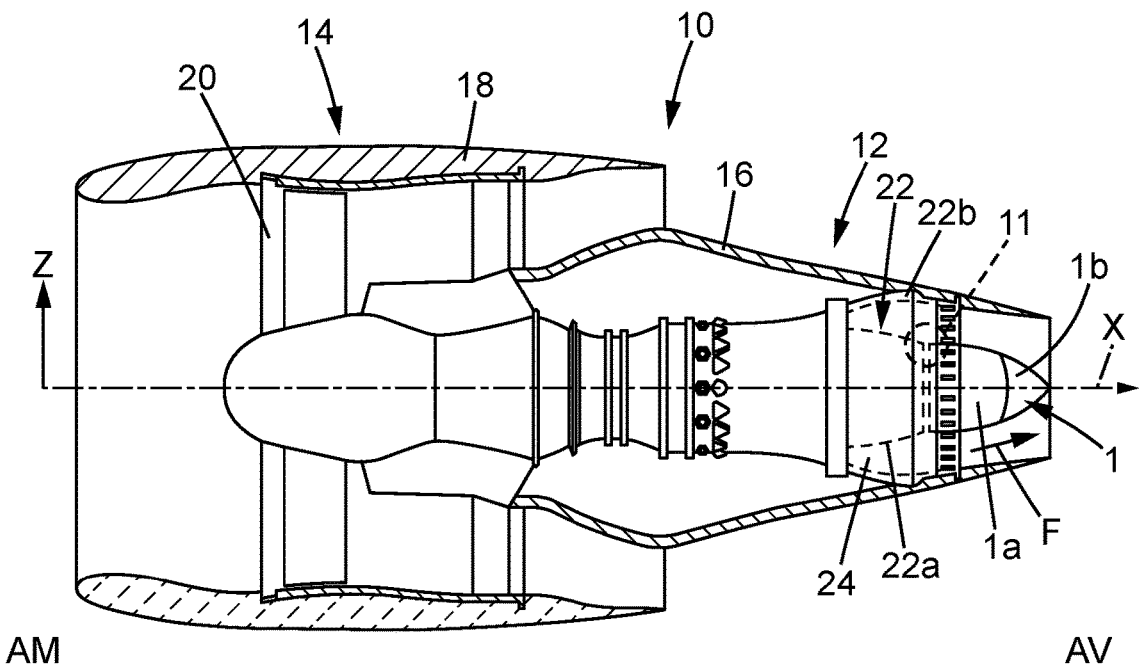
FIG. 1, already described, represents a schematic sectional profile of a turbomachine for an aircraft.
Figure 2:
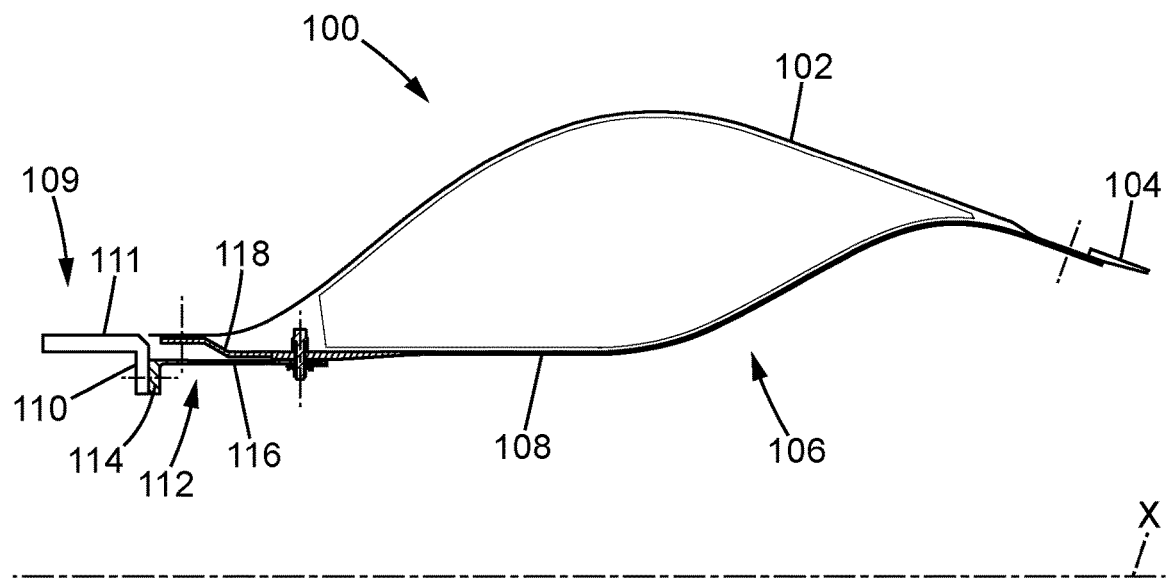
FIG. 2 represents a schematic sectional view of a portion of an exhaust cone equipped with a first example of elastic means.

Referring to FIG. 2, the nozzle exhaust cone 100 comprises an outer annular wall 102 for the flow of a primary air flow connected to a conical downstream portion 104 of the exhaust cone, for example by bolting.

For example, the outer annular wall 102 is metallic or made of a composite with a ceramic matrix and the conical downstream portion 104 is made of a composite material with a ceramic or metallic matrix.

An annular acoustic box 106 is arranged in the outer annular wall 102. The annular acoustic box 106 comprises an inner annular wall 108 arranged radially inside the outer annular wall 102 and a plurality of partitions not represented in FIG. 2 and arranged radially between the outer annular wall 102 and the inner annular wall 108. Other annular boxes could be arranged herein without these consisting of annular boxes ensuring an acoustic function, i.e. reducing the air outlet noises of the turbomachine.

For example, the inner annular wall 108 and/or the acoustic partitions may be made of a metal or composite material with a ceramic matrix.

The exhaust cone 100 is connected to a flange 110 of an exhaust case 109 of the nozzle carrying the exhaust cone 100. In particular, the inner annular wall 108 is connected to the flange 110 of the exhaust case 109 by a connecting member 112.

The connecting member 112 comprises an annular flange 114 coupled to the flange 110 of the exhaust case 109 and a plurality of fastening lugs 116 distributed circumferentially around a longitudinal axis X. Each fastening lug 116 is fastened to an upstream portion of the inner annular wall 108. The fastening lugs 116 may be flexible or rigid. The connecting member 112 may be metallic. The fastening lugs 116 may be connected to the inner annular wall 108 by bolting.

The downstream portion of the outer annular wall 102 may be connected to the downstream portion of the inner annular wall 108 as illustrated in FIG. 2. On the other hand, the upstream portion of the outer annular wall 102 is free to move relative to the inner annular wall 108. This arrangement enables deformations of the upstream portion of the outer annular wall 102 due to the thermomechanical stresses related to the operating temperature of the exhaust cone 100 and the difference in the materials in the exhaust cone 100.

In addition, a plurality of elastic means 118 are arranged radially between the outer annular wall 102 and the connecting member 112, so as to be radially prestressed by the outer annular wall 102 against the inner annular wall 108 or the connecting member 112.

The radially deformable elastic means 118 are distributed circumferentially around the longitudinal axis X. For example, each elastic means 118 may be formed by a radially deformable leaf extending axially from the annular wall 102 towards the inner annular wall 108 and radially outwards.

The elastic means 118 allow distributing the forces between the upstream and downstream junction of the outer annular wall 102 and therefore reducing the thickness of the outer annular wall 102 as well as its mass. In addition, the elastic means 118 improve the vibratory behavior of the outer annular wall 102.

The outer annular wall 102 extends so as to form a continuity of a shroud 111 of the exhaust case 109.

Figure 3:
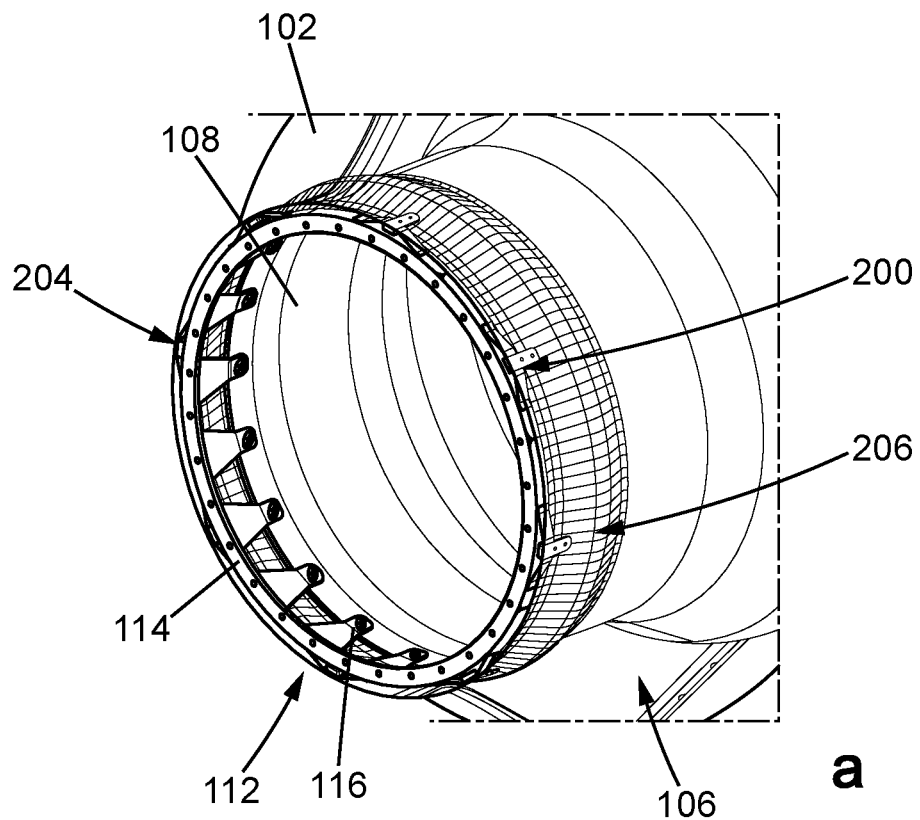
FIGS. 3a and 3b represent a schematic perspective view of the upstream portion of an exhaust cone equipped with a second example of elastic means.
Figure 3:
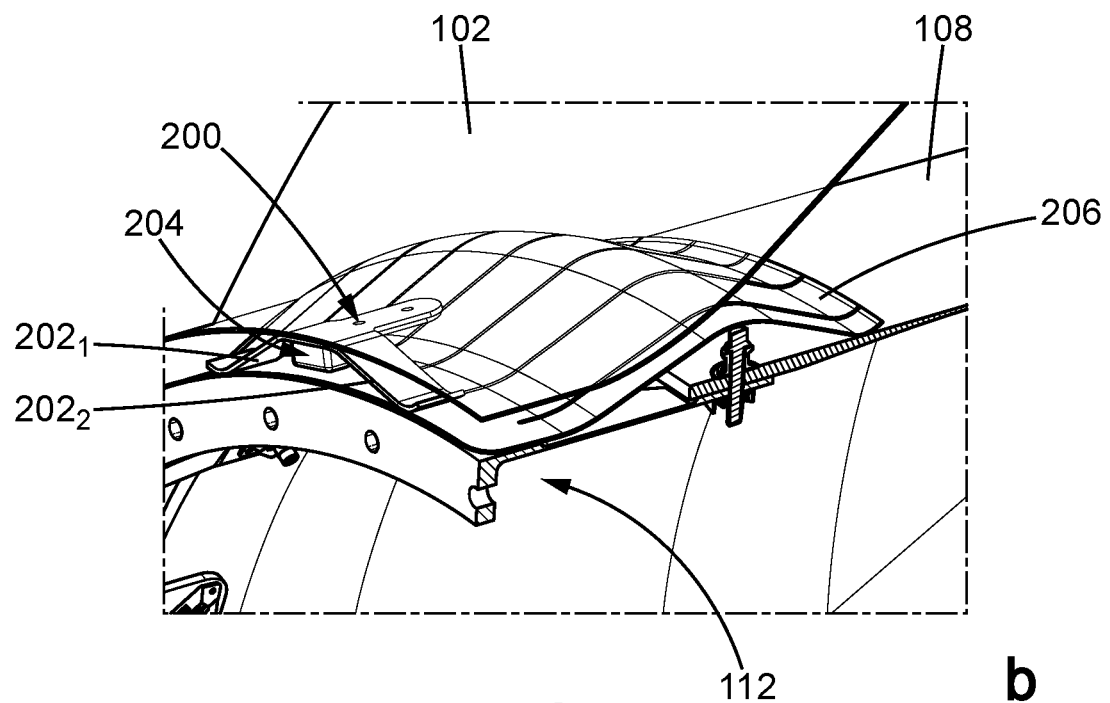
Figure 4:
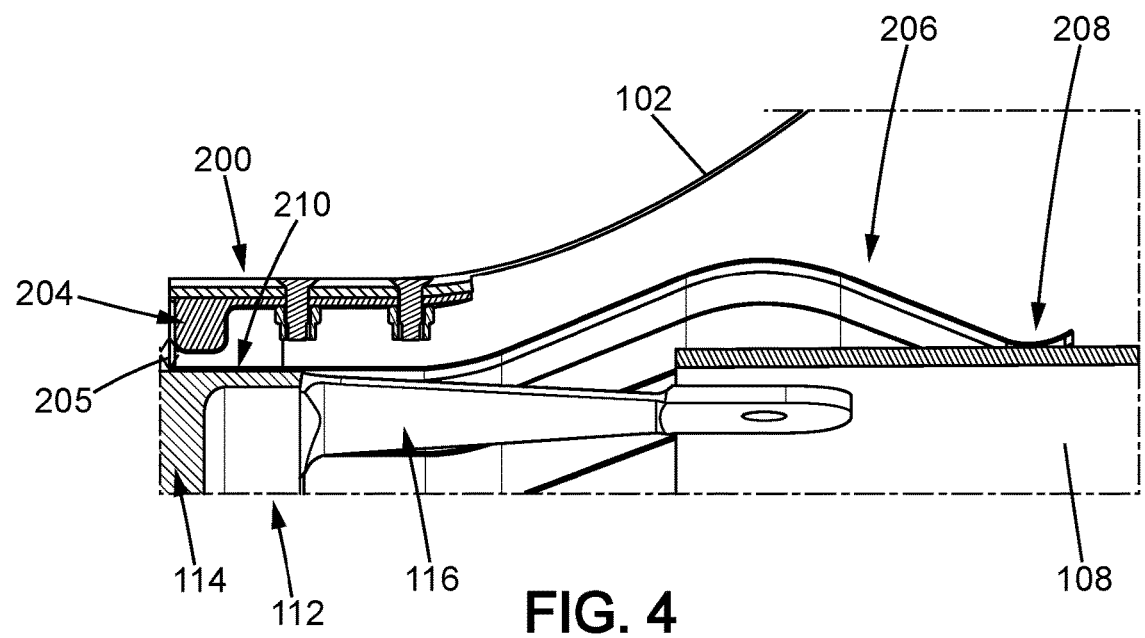
FIG. 4 represents a sectional view of the upstream portion of the exhaust cone of FIG. 3.

In the example of FIGS. 3a, 3b and 4, the exhaust cone 100 of FIG. 2 is provided with elastic means 200, on the one hand, fastened to the outer annular wall 102, and on the other hand bearing against the annular flange 114 of the connecting member 112. The elastic means 200 are formed by leaf springs, each comprising a first leaf 2021 extending radially inwards from the outer annular wall 102 and in a first direction of a circumferential direction around the longitudinal axis X. Each leaf spring comprises a second leaf 2022 extending radially inwards from the outer annular wall 102 and in a second direction of the circumferential direction opposite to the first direction. The first and second leaves 202 are flexible and can deform radially.

Radial displacement limiting means 204 in the form of buffers 204 are arranged radially between the outer annular wall 102 and the connecting member 112. A predetermined distance 205 is kept radially between the buffers 202 and the connecting member 112 so as to form a stop if the outer annular wall 102 undergoes considerable radial deformations, i.e. a radial deformation greater than the predetermined distance 205. Each buffer 204 is fastened to a leaf spring 200, in particular on a central portion of the leaf spring 200 between the first and second leaves 202. The buffers 204 may be rigid or flexible.

The buffers 204 may be assembled to the leaf springs 200 or formed integrally with the leaf springs 200.

The exhaust cone 100 is further provided with a first seal 206 with an annular shape around the longitudinal axis X and surrounding on the one hand the axial space between the inner annular wall 108 and the circumferential spaces between the fastening lugs 116. Thus, the primary air flow cannot infiltrate inside the exhaust cone 100 which might reduce the performances of the nozzle carrying the exhaust cone 100.

The first seal 206 is made of a metallic material, for example tungsten or Inconel, to withstand the high temperatures of the primary air.

The first seal 206 may be formed by a plurality of angular sectors connected together and partially overlapping.

The first seal 206 comprises a downstream end 208 arranged so as to bear against the inner annular wall 108 and an upstream end 210 arranged so as to bear against the annular flange 114 of the connecting member 112. The upstream end 210 of the first seal 206 may be fastened directly on the annular flange 114 of the connecting member 112.

The leaf springs 200 are in contact with the first seal 206.

Figure 5:
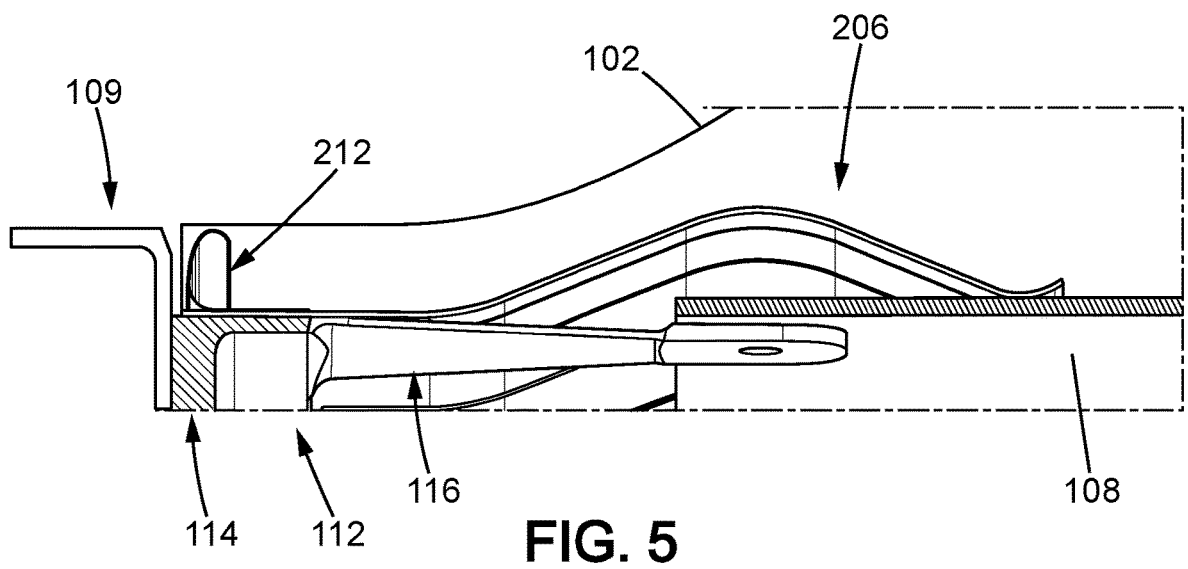
FIG. 5 represents a sectional view of the upstream portion of an exhaust cone equipped with an example of a primary air flow recirculation seal.

FIG. 5 represents an arrangement similar to the arrangement of the exhaust cone 100 of FIGS. 3 and 4. Conversely, the exhaust cone 100 of FIG. 5 is provided with a second seal 212 arranged so as to radially cover the space between the annular flange 114 of the connecting member 112 and the outer annular wall 102.

The outer annular wall 102 bears against the second seal 212. The second seal 212 may be fastened to the annular flange 114 of the connecting member 112 or may be arranged in contact against the annular flange 114 of the connecting member 112. The second annular seal 212 is metallic and is formed by a plurality of angular sectors distributed circumferentially around the longitudinal axis and connected together so as to form the second annular seal 212.

Figure 6:
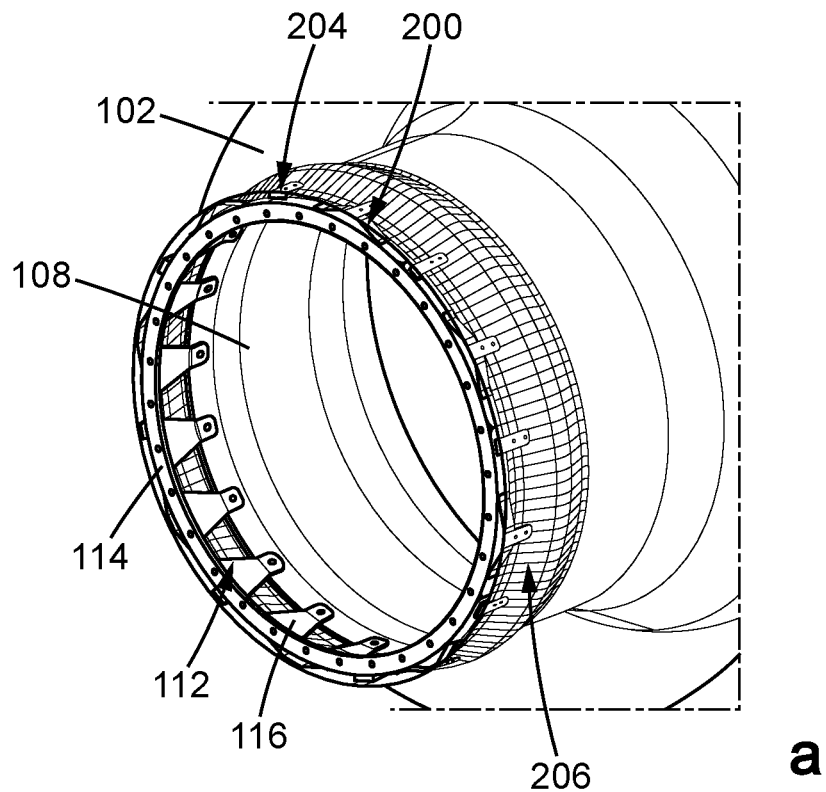
FIGS. 6a and 6b represent a schematic perspective view of the upstream portion of an exhaust cone equipped with a variant of the second example of elastic means.
Figure 6:
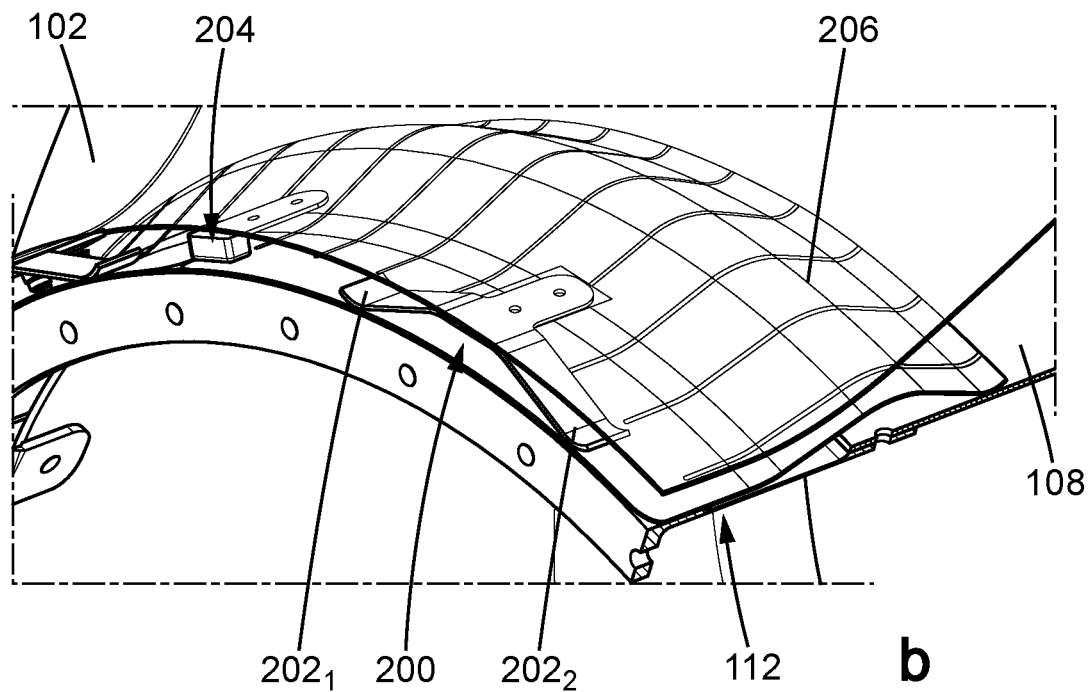

In the variant of FIGS. 6a and 6b, the elastic means 200 are decoupled from the radial displacement limiting means 204. Each elastic means 200 is circumferentially spaced apart from a radial displacement limiting means 204.

The elastic means 200 and the radial displacement limiting means 204 are fastened directly to the outer annular wall 102 and are arranged on the same circumferential row.

Figure 7:
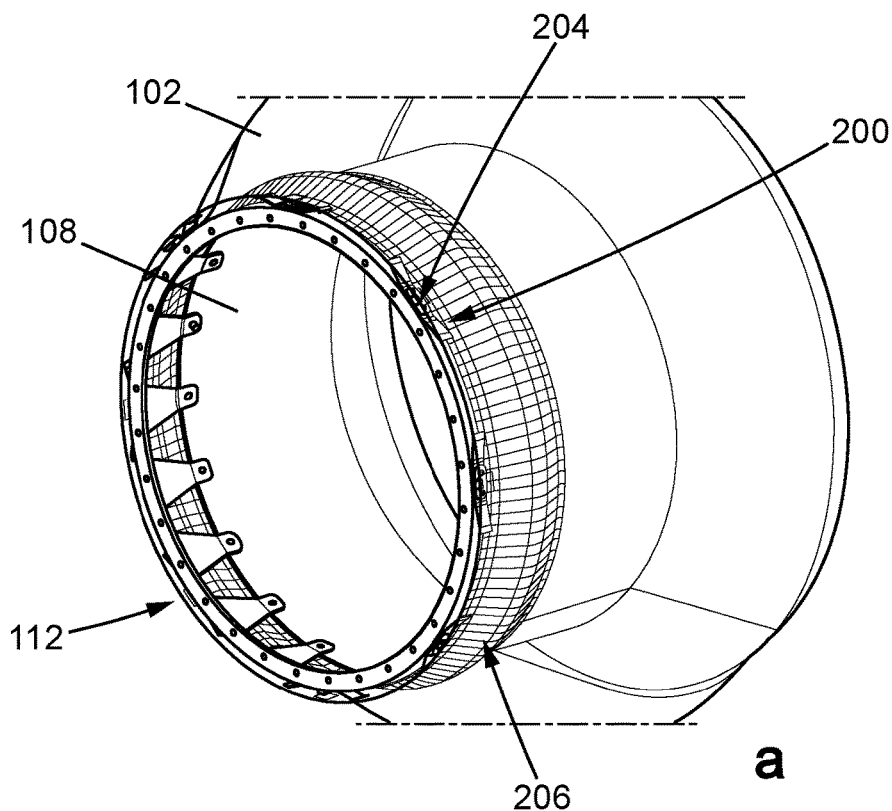
FIGS. 7a and 7b represent a schematic perspective view of the upstream portion of an exhaust cone equipped with a variant of the second example of elastic means.
Figure 7:
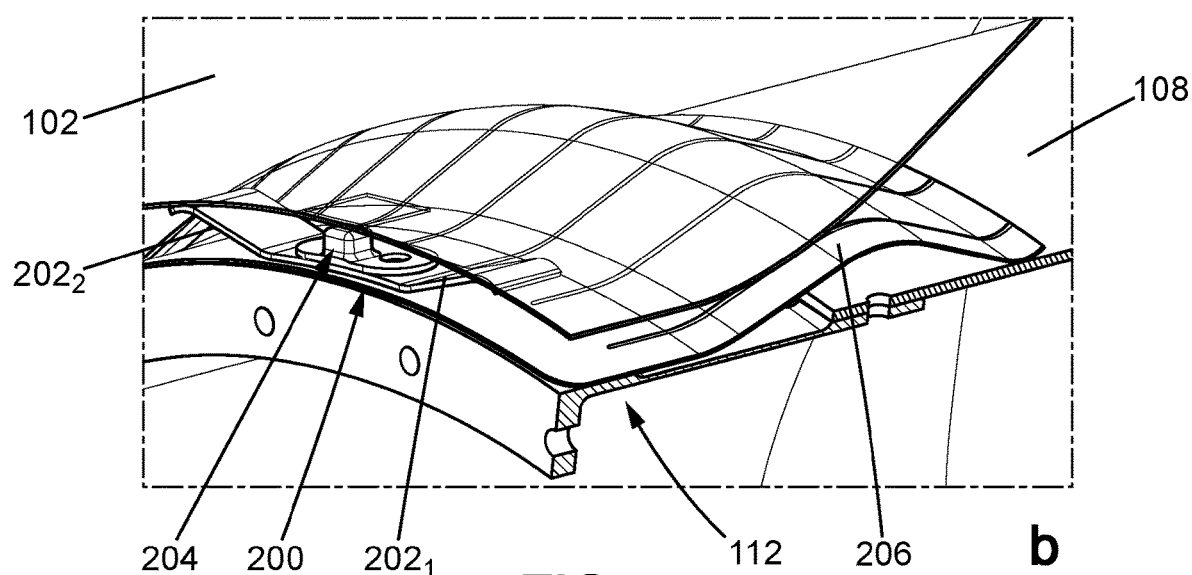

In the variant of FIGS. 7a and 7b, the elastic means 200 and the radial displacement limiting means 204 are fastened to the inner annular wall 108, in particular to the first seal 206. The elastic means 200 and the radial displacement limiting means 204 are superimposed and arranged circumferentially at the same location.

Figure 8:
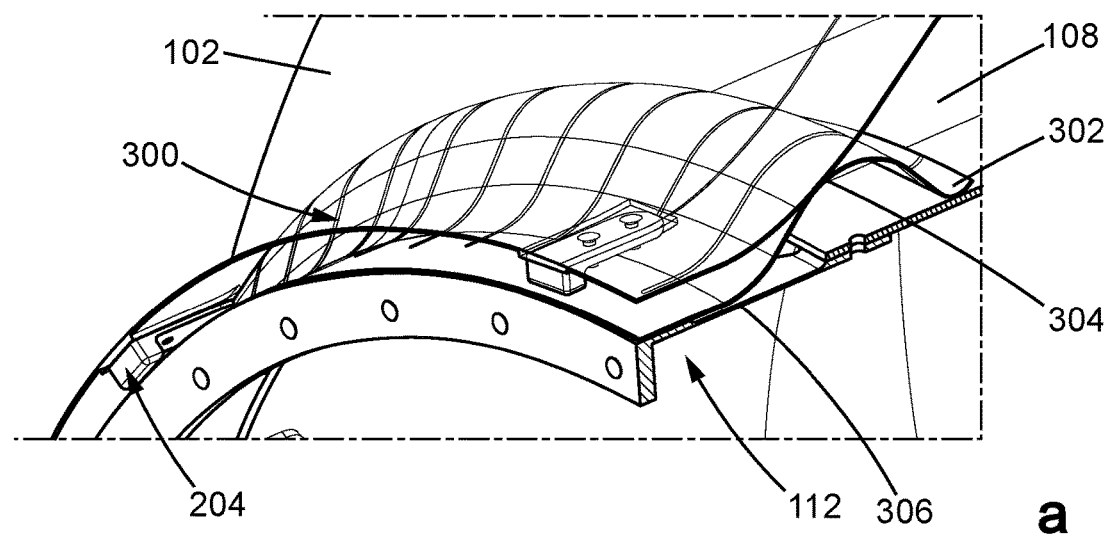
Figure 8:
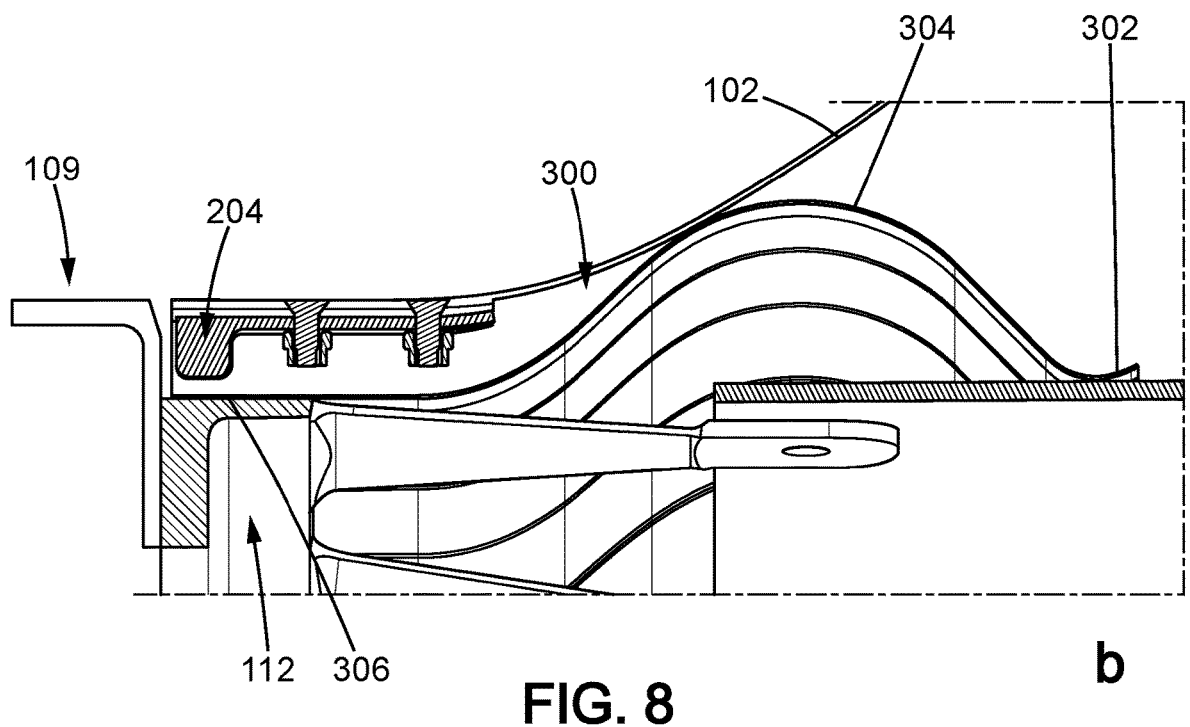

Referring to FIGS. 8a and 8b, the exhaust cone 100 is equipped with one single annular elastic means 300 arranged on the one hand in contact against the inner annular wall 108 and on the other hand in contact with the outer annular wall 102.

The annular elastic means 300 has a downstream end bearing against the inner annular wall 108 and an upstream end 306 bearing against the connecting member 112. The upstream end 306 may also be fastened to the connecting member 112. The annular elastic means 300 comprises a protuberance 304 extending radially outward. The outer annular wall 102 bears against the protuberance 304.

Figure 9:
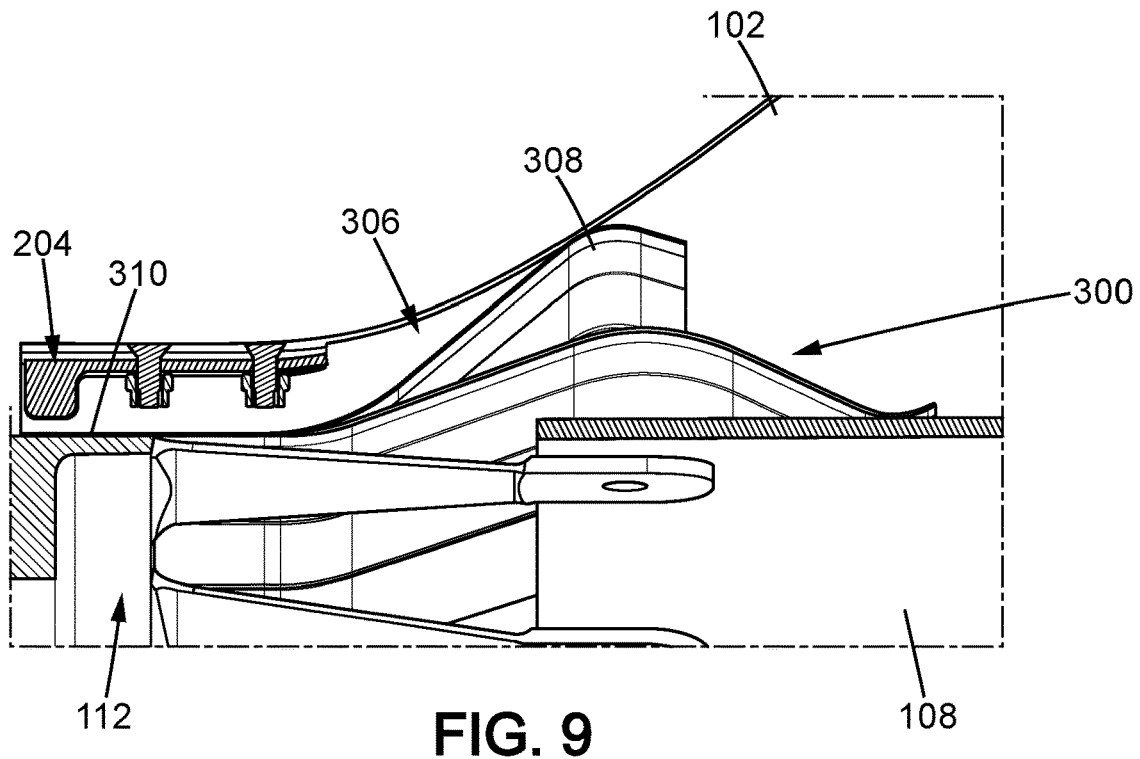
FIG. 9 represents a schematic sectional view of the upstream portion of an exhaust cone equipped with a variant of the third example of elastic means.

The annular elastic means 300 may be metallic and formed by a plurality of angular sectors connected together. In the variant of FIG. 9, a second annular seal 306 is arranged around the annular elastic means 300. The second seal 306 has an upstream end 308 extending radially outward and comes against the outer annular wall 102. The second seal 306 has an upstream end 310 bearing against the flange 114 of the connecting member 112.

The second seal 306 allows preventing the primary air flow from infiltrating inside the inner annular wall 108.

Figure 10:
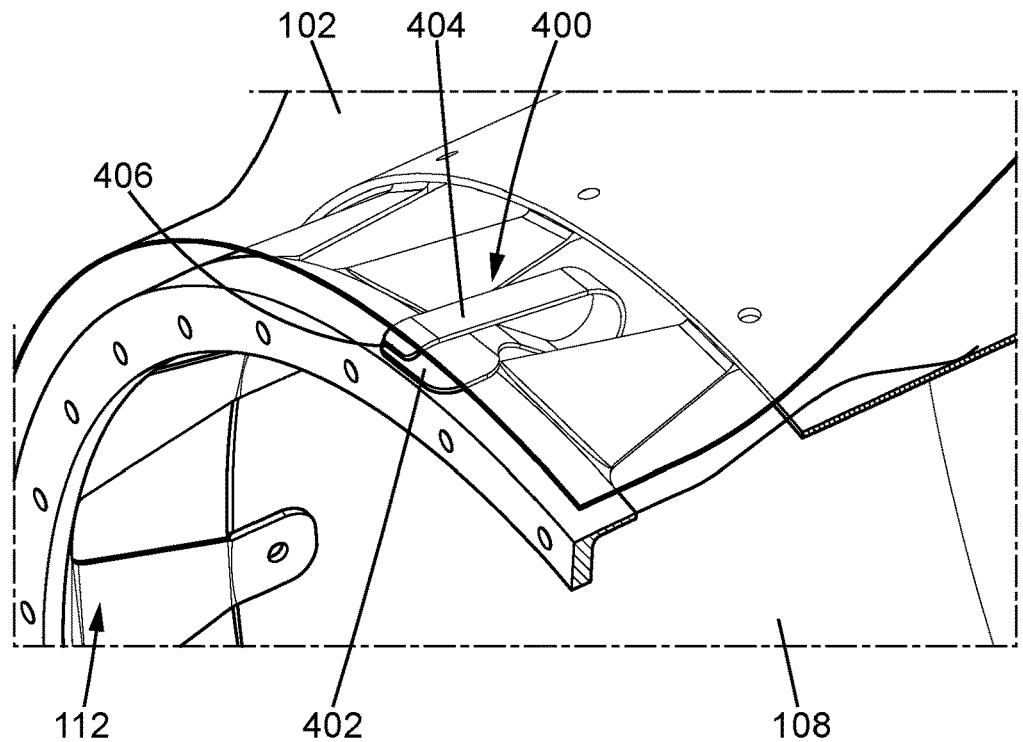
FIG. 10 represents a schematic perspective view of an upstream portion of an exhaust cone equipped with a fourth example of elastic means.

Referring to FIG. 10, the exhaust cone is provided with a plurality of elastic means 400 having a radially inner end 402 connected to the annular flange 114 of the connecting member 112. The elastic means 400 further have a leaf 404 extending longitudinally and is arranged radially at a distance from the radially inner end 402.

The elastic means 400 further form radial displacement limiting means through the radially outer end 406. This radially outer end 406 has a rim extending radially inward.

The exhaust cone may further comprise elastic means 400, radial displacement limiting means such as radial displacement limiting means 204.

The invention claimed is:

1. An assembly for a turbomachine with a longitudinal axis (X) comprising:
    an exhaust cone comprising an outer annular wall for the flow of a primary air flow and an annular box arranged radially inside said outer annular wall, the annular box comprising an inner annular wall arranged radially inside the outer annular wall of the exhaust cone,
    an exhaust case arranged upstream of the exhaust cone, and
    a connecting member interposed longitudinally between the exhaust case and the exhaust cone, the connecting member being fastened to the exhaust case and to the inner annular wall,
    said assembly further comprising at least one elastic means radially deformable and radially prestressed between the outer annular wall and the connecting member,
    wherein the connecting member comprises an annular flange connected to a corresponding flange of the exhaust case and a plurality of fastening lugs distributed circumferentially around the longitudinal axis and connected to the inner annular wall.

2. The assembly according to claim 1, further comprising means for limiting a radial displacement of the outer annular wall, said radial displacement limiting means being interposed between the outer annular wall and the connecting member, wherein said radial displacement limiting means form a radial stop of the outer annular wall against the connecting member.

3. The assembly according to claim 1, wherein the elastic means are fastened to the outer annular wall and are in radial contact against the connecting member or fastened to the connecting member and are in radial contact against the outer annular wall.

4. The assembly according to claim 2, wherein the radial displacement limiting means are fastened to the outer annular wall and are in radial contact against the connecting member or fastened to the connecting member and are in radial contact against the outer annular wall.

5. The assembly according to claim 2, wherein at least one elastic means is superimposed with a radial displacement limiting means.

6. The assembly according to claim 2, wherein at least one elastic means is circumferentially spaced apart from one of the radial displacement limiting means.

7. The assembly according to claim 1, wherein at least one elastic means is a leaf spring, the leaf springs being distributed circumferentially around the longitudinal axis.

8. The assembly according to claim 7, wherein at least one of said leaf springs comprises a first flexible leaf extending in a first direction of the circumferential direction around the longitudinal axis and a second flexible leaf extending in a second direction of the circumferential direction around the longitudinal axis (X) opposite to the first direction.

9. The assembly according to claim 7, wherein at least one of said leaf springs comprises one single leaf extending radially along the longitudinal axis (X).

10. The assembly according to claim 9, wherein at least one of said leaf springs forms a radial displacement limiting means.

11. The assembly according to claim 1, further comprising a first annular seal surrounding the junction between the connecting member and the inner annular wall, said first annular seal being configured to limit the circulation of the primary air flow towards a cavity of the exhaust cone.

12. The assembly according to claim 1, further comprising a second annular seal connected to the connecting member and extending radially towards the outer annular wall, said second annular seal being configured to prevent the primary air flow from passing through the outer annular wall.

13. The assembly according to claim 1, wherein the elastic means are formed by an annular seal fastened to the connecting member and comprising a radially deformable part bearing against the outer annular wall.

14. The assembly according to claim 2, wherein each displacement limiting means is formed by a buffer, wherein the buffers being are distributed circumferentially around the longitudinal axis (X) and are held at a predetermined distance with the connecting member in the radial direction.

15. The assembly according to claim 1, wherein a downstream portion of the outer annular wall is fastened to a downstream portion of the inner annular wall.

16. A turbomachine nozzle comprising an assembly according to claim 1.

* * * * *